(12) United States Patent
Ozawa et al.

(10) Patent No.: US 11,498,456 B2
(45) Date of Patent: Nov. 15, 2022

(54) SEAT OCCUPANCY SENSOR

(71) Applicant: TS TECH CO., LTD., Saitama (JP)

(72) Inventors: Hidetoshi Ozawa, Tochigi (JP);
Naohiro Sasaki, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 326 days.

(21) Appl. No.: 16/652,111

(22) PCT Filed: Sep. 28, 2018

(86) PCT No.: PCT/JP2018/036358
§ 371 (c)(1),
(2) Date: Mar. 30, 2020

(87) PCT Pub. No.: WO2019/069819
PCT Pub. Date: Apr. 11, 2019

(65) Prior Publication Data
US 2020/0307414 A1 Oct. 1, 2020

(30) Foreign Application Priority Data
Oct. 6, 2017 (JP) .............................. JP2017-195943

(51) Int. Cl.
*G06F 3/033* (2013.01)
*B60N 2/00* (2006.01)
(Continued)

(52) U.S. Cl.
CPC ........... *B60N 2/002* (2013.01); *H01H 13/704* (2013.01); *H01H 13/807* (2013.01)

(58) Field of Classification Search
CPC .... B60N 2/002; H01H 13/704; H01H 13/807; G06F 3/033
See application file for complete search history.

(56) References Cited

U.S. PATENT DOCUMENTS 10,196,025 B2 * 2/2019 Fujii .................... B60R 21/0152
2006/0150752 A1 7/2006 Lorenz et al.
(Continued)

FOREIGN PATENT DOCUMENTS

| EP | 3178690 | 6/2017 |
| JP | 2007526844 | 9/2007 |

(Continued)

OTHER PUBLICATIONS

International Search Report for PCT/JP2018/036358 dated Nov. 14, 2018, 1 page.

*Primary Examiner* — Pegeman Karimi
(74) *Attorney, Agent, or Firm* — Dority & Manning, P.A.

(57) ABSTRACT

To provide a seat occupancy sensor for detecting a seated occupant, a seat occupancy sensor provided in a vehicle seat includes a pair of switch modules disposed in an occupant seating area of a seat cushion, wherein: each of the switch modules includes a first pressure-sensitive switch and a second pressure-sensitive switch that are disposed on a front part so as to be laterally spaced from each other and a third pressure-sensitive switch disposed on a rear part; each of the switch modules is configured to be turned on when at least one of the first pressure-sensitive switch and the second pressure-sensitive switch is on and the third pressure-sensitive switch is on; and the seat occupancy sensor is configured to be turned on when the switch modules are both on.

11 Claims, 13 Drawing Sheets

(51) Int. Cl.
*H01H 13/704* (2006.01)
*H01H 13/807* (2006.01)

(56) References Cited

U.S. PATENT DOCUMENTS

| | | | | |
|---|---|---|---|---|
| 2008/0046152 A1* | 2/2008 | Ohtake | ............. | B60R 21/01516 |
| | | | | 701/49 |
| 2011/0241860 A1* | 10/2011 | Andrews | ................ | B60N 2/002 |
| | | | | 701/45 |
| 2017/0369017 A1* | 12/2017 | Fujii | ................ | B60R 21/01516 |
| 2021/0170914 A1* | 6/2021 | Kawahira | ............... | B60N 2/002 |

FOREIGN PATENT DOCUMENTS

| | | |
|---|---|---|
| JP | 2013014181 | 1/2013 |
| JP | 2017109728 | 6/2017 |

* cited by examiner

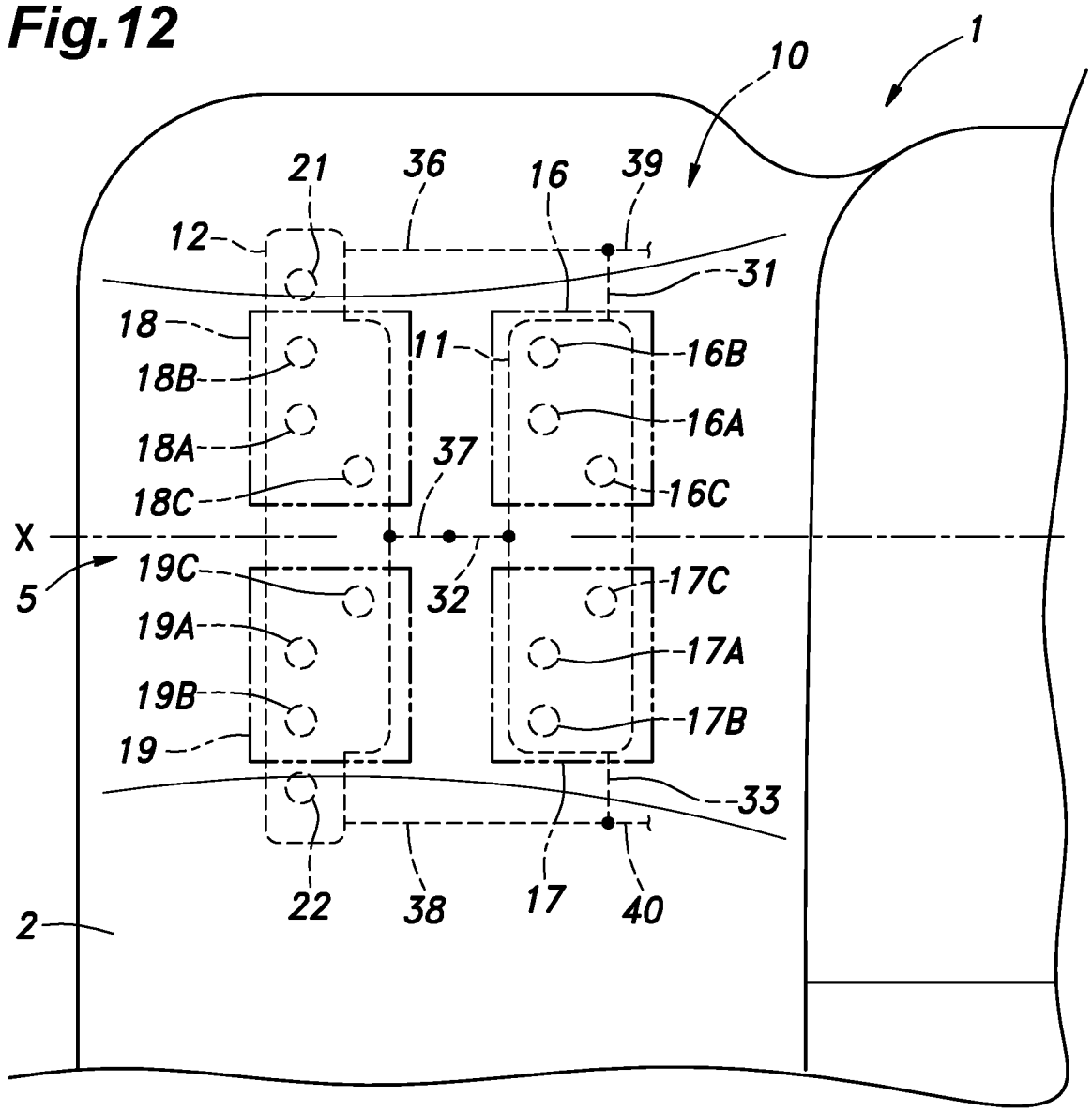

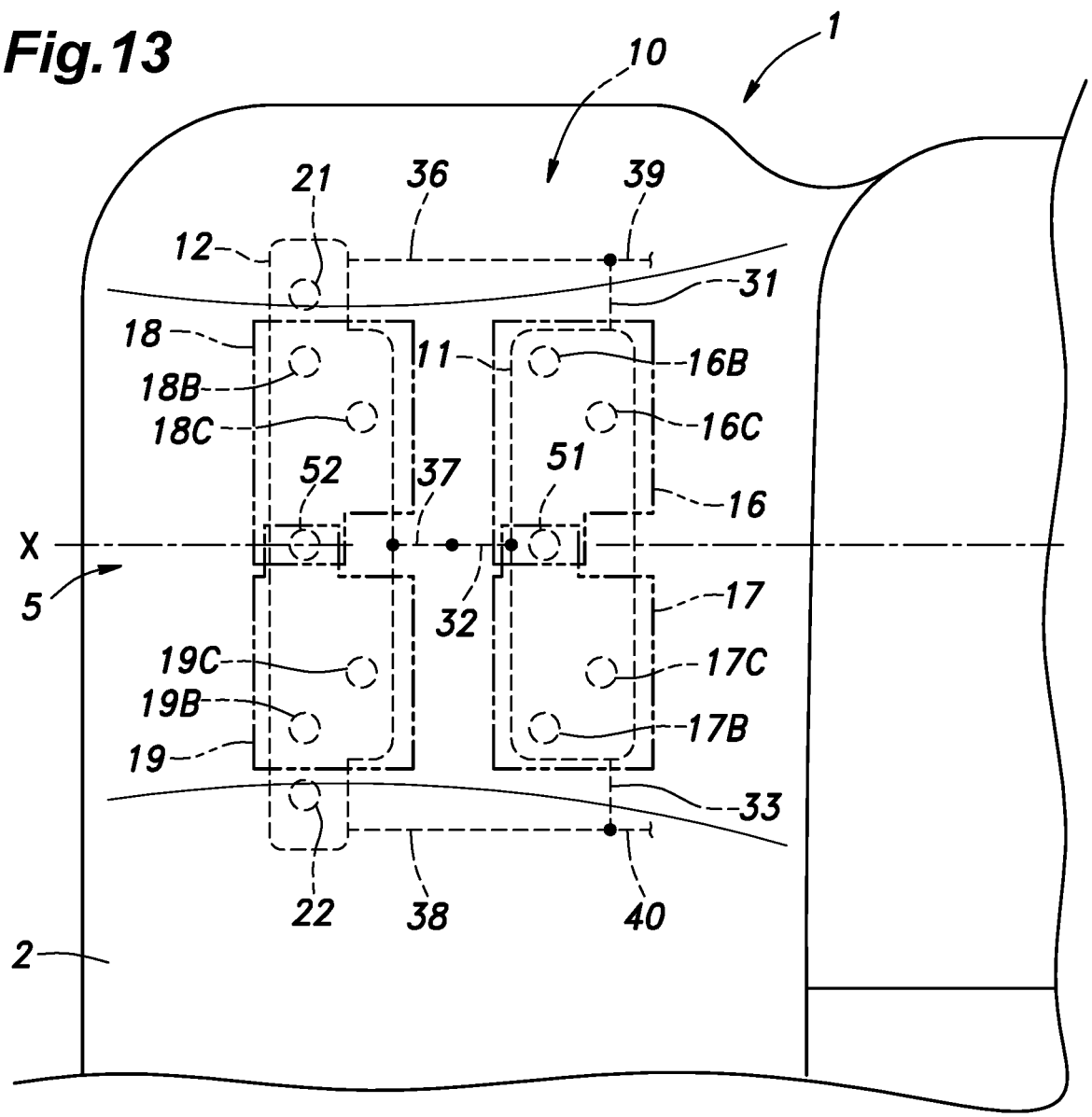

SEAT OCCUPANCY SENSOR

CROSS REFERENCE TO RELATED APPLICATIONS

This application is the U.S. National Stage entry of International Application Number PCT/JP2018/036358 filed under the Patent Cooperation Treaty having a filing date of Sep. 28, 2018, which claims priority to Japanese Patent Application No. 2017-195943 having a filing date of Oct. 6, 2017, which are incorporated herein by reference.

TECHNICAL FIELD

The present invention relates to a seat occupancy sensor for detecting that an occupant is seated.

BACKGROUND ART

A seat occupancy sensor that includes multiple pressure-sensitive switches in the seating area of a vehicle seat and is switched on and off in accordance with whether an occupant is seated is known (for example, Patent Document 1). The seat occupancy sensor described in Patent Document 1 includes multiple pairs of left and right pressure-sensitive switches. The left and right pressure-sensitive switches of each pair are connected in series with each other to form a detection unit. The detection units are arranged in the fore-and-aft direction and are connected in parallel to each other. When the left and right pressure-sensitive switches of one detection unit are both turned on, the detection unit is turned on, which turns on the seat occupancy sensor. Since the multiple detection units are arranged in the fore-and-aft direction, the seat occupancy sensor can detect that an occupant is seated even if the occupant is seated on a front part or a rear part of the seating area.

PRIOR ART DOCUMENT(S)

Patent Document(s)

Patent Document 1: JP2007-526844A

SUMMARY OF THE INVENTION

Task to be Accomplished by the Invention

Sometimes a box-shaped object may be placed on the seating area of the vehicle seat. Since the box-shaped object may be inclined in accordance with the shape of the seating area, a pressure may be applied to the seating area from an edge portion of the box-shaped object. As a result, an area where the pressure is greater than or equal to a predetermined pressure may be formed in the seating area to extend linearly in the lateral direction. In such a case, the left and right pressure-sensitive switches forming a pair may be both turned on, and thus, it is difficult in the seat occupancy sensor described in Patent Document 1 to distinguish between an occupant and a box-shaped object.

In addition, the distribution of pressure applied to the seating area when the occupant is seated significantly depends on the posture of the occupant (the occupant may be seated with the thighs open, may be seated to face obliquely forward, etc.). Thus, it is desirable that the seat occupancy sensor is capable of distinguishing between an occupant and a box-like object such as a cardboard box and detecting that an occupant is seated regardless of the posture of the occupant.

In view of the above background, an object of the present invention is to provide a seat occupancy sensor capable of detecting that an occupant is seated on a seat.

Means for Accomplishing the Task

To achieve such an object, there is provided a seat occupancy sensor (10) provided in a vehicle seat (1), comprising a pair of switch modules (16, 17; 18, 19) disposed in an occupant seating area (5) of a seat cushion (2) so as to be laterally spaced from each other, wherein: each of the switch modules includes a first pressure-sensitive switch (16A, 17A, 18A, 19A) and a second pressure-sensitive switch (16B, 17B, 18B, 19B) that are disposed on a front part so as to be laterally spaced from each other and a third pressure-sensitive switch (16C, 17C, 18C, 19C) disposed on a rear part; each of the switch modules is configured to be turned on when at least one of the first pressure-sensitive switch and the second pressure-sensitive switch is on and the third pressure-sensitive switch is on; and the seat occupancy sensor is configured to be turned on when the switch modules are both on.

According to this configuration, when an area having a predetermined pressure or higher is distributed to spread in the fore-and-aft direction and laterally in the seating area, both the switch modules are turned on and hence the seat occupancy sensor is turned on. Therefore, it is possible to distinguish between when a box-shaped object that would generate a linear pressure distribution is placed on the seating area and when an occupant is seated. Further, because each switch module is turned on when one of the first pressure-sensitive switch and the second pressure-sensitive switch is on and the third pressure-sensitive switch is on, it is possible to cope with various postures of an occupant that may generate different lateral pressure distributions in the front part of the seating area.

In the above aspect, preferably, each of the first pressure-sensitive switch, the second pressure-sensitive switch, and the third pressure-sensitive switch is a switch configured to be conductive and turned on when a predetermined pressure is applied; in each of the switch modules, the first pressure-sensitive switch and the second pressure-sensitive switch are electrically connected in parallel and the third pressure-sensitive switch is connected in series with the first pressure-sensitive switch and the second pressure that are connected in parallel; and the switch modules are electrically connected in series with each other.

According to this configuration, the seat occupancy sensor can be configured by electrically connecting the pressure-sensitive switches, whereby the configuration of the seat occupancy sensor can be simplified.

In the above aspect, preferably, the switch modules include two pairs of left and right switch modules arranged such that one pair is located behind the other; the rear pair of switch modules includes a first switch module (16) disposed on a right side and a second switch module (17) disposed on a left side; the front pair of switch modules includes a third switch module (18) disposed on a right side and a fourth switch module disposed on a left side (19); the third switch module is located in front of the first switch module; the fourth switch module is located in front of the second switch module; and the seat occupancy sensor is configured to be turned on when both the first switch module and the second switch module are on or when both the third switch module and the fourth switch module are on.

According to this configuration, even when the occupant is seated on a front part of the seating area, the third switch module and the fourth switch module are turned on, and therefore, it is possible to detect that the occupant is seated by using the seat occupancy sensor.

In the above aspect, preferably, the first switch module and the second switch module are electrically connected in series; the third switch module and the fourth switch module are electrically connected in series; and the first switch module and the second switch module that are connected in series are electrically connected in parallel to the third switch module and the fourth switch module that are connected in series.

According to this configuration, the seat occupancy sensor for detecting that an occupant is seated even when the occupant is seated on a front or rear part of the seating area can be configured by electrical connection. Therefore, the configuration of the seat occupancy sensor can be simplified.

In the above aspect, preferably, the seat occupancy sensor is configured to be also turned on when the first switch module and the fourth switch module are on or when the second switch module and the third switch module are on.

According to this configuration, even when the occupant is seated on the seating area to face in a front right or front left direction, it is possible to detect that the occupant is seated by using the seat occupancy sensor.

In the above aspect, preferably, the first switch module and the third switch module are electrically connected in parallel; the second switch module and the fourth switch module are electrically connected in parallel; and the first switch module and the third switch module that are connected in parallel are electrically connected in series with the second switch module and the fourth switch module that are connected in parallel.

According to this configuration, the seat occupancy sensor which is capable of detecting that the occupant is seated even when the occupant is seated on the seating area to face the front right or front left direction can be configured by electrical wiring. Therefore, the configuration of the seat occupancy sensor can be simplified.

In the above aspect, preferably, the third pressure-sensitive switch of each of the first switch module and the second switch module is disposed below a hip point (H) set in the vehicle seat in side view.

According to this configuration, since the third pressure-sensitive switches are arranged at positions corresponding to the buttocks of the occupant, the first pressure-sensitive switches and the second pressure-sensitive switches are located in front of the buttocks or on the thigh side. Therefore, even when the occupant takes a posture in which the positions of the thighs are laterally different, it is possible to detect that the occupant is seated by using the seat occupancy sensor.

In the above aspect, preferably, the third pressure-sensitive switch of the first switch module and the third pressure-sensitive switch of the second switch module are spaced from each other so as to be symmetrically arranged with respect to the hip point in top view.

According to this configuration, since the third pressure-sensitive switches of the first switch module and the second switch module are arranged symmetrically to the left and right of the hip point, the load from the buttocks of the occupant is easily applied to the respective third pressure-sensitive switches, whereby it is possible to detect that the occupant is seated more accurately by using the seat occupancy sensor.

In the above aspect, preferably, the seat occupancy sensor further comprises a first additional pressure-sensitive switch (21) provided to the right of the third switch module and a second additional pressure-sensitive switch (22) provided to the left of the fourth switch module, wherein the seat occupancy sensor is configured to be turned on regardless of a state of the third switch module and the fourth switch module.

According to this configuration, the additional switches can be arranged outside the buttocks of the occupant, and the additional switches may be configured to be turned on when the additional switches are pressed with a predetermined pressure or higher. Thereby, when a booster seat is placed on an upper surface of the seat cushion and the occupant is seated on the booster seat, this can be detected by using the seat occupancy sensor.

In the above aspect, preferably, in each of the switch modules, the third pressure-sensitive switch is disposed at a center between the corresponding first pressure-sensitive switch and second pressure-sensitive switch with respect to a lateral direction.

According to this configuration, the positions of the first pressure-sensitive switch and the second pressure-sensitive switch are arranged laterally side by side in front of the hip joint of the occupant. As a result, the first pressure-sensitive switch and the second pressure-sensitive switch are disposed at positions to be pressed by the thigh of the occupant. Therefore, regardless of the positions of the thighs of the occupant, it is possible to detect that the occupant is seated more accurately by using the seat occupancy sensor.

In the above aspect, preferably, the vehicle seat constitutes a rear seat of a wheeled vehicle.

According to this configuration, in the rear seat where the posture of the occupant can change significantly, it is possible to detect that the occupant is seated by using the seat occupancy sensor.

Effect of the Invention

As described above, according to the aspect in which each of the two switch modules is configured to be turned on when at least one of the first pressure-sensitive switch and the second pressure-sensitive switch is on and the third pressure-sensitive switch is on and the seat occupancy sensor is configured to be turned on when the switch modules are both on, it is possible to distinguish between when a box-shaped object that generates a linear pressure distribution is placed on the seating area and when an occupant is seated. Further, it is possible to cope with various postures of an occupant that may generate different lateral pressure distributions in the front part of the seating area.

According to the aspect in which, in each of the two switch modules, the first pressure-sensitive switch and the second pressure-sensitive switch are electrically connected in parallel and the third pressure-sensitive switch is connected in series with the first pressure-sensitive switch and the second pressure that are connected in parallel, and the switch modules are electrically connected in series with each other, the seat occupancy sensor can be configured by electrically connecting the pressure-sensitive switches, whereby the configuration of the seat occupancy sensor can be simplified.

According to the aspect in which the switch modules include two pairs of left and right switch modules arranged such that one pair is located behind the other and the seat occupancy sensor is configured to be turned on when both the first switch module and the second switch module are on or when both the third switch module and the fourth switch module are on, even when the occupant is seated on a front part of the seating area, the third switch module and the fourth switch module are turned on, and therefore, it is possible to detect that the occupant is seated by using the seat occupancy sensor.

According to the aspect in which the first switch module and the second switch module are electrically connected in series; the third switch module and the fourth switch module are electrically connected in series; and the first switch module and the second switch module that are connected in series are electrically connected in parallel to the third switch module and the fourth switch module that are connected in series, the seat occupancy sensor for detecting that the occupant is seated even when the occupant is seated on the front or rear part of the seating area can be configured by electrical connection. Therefore, the configuration of the seat occupancy sensor can be simplified.

According to the aspect in which the seat occupancy sensor is configured to be also turned on when the first switch module and the fourth switch module are on or when the second switch module and the third switch module are on, even when the occupant is seated on the seating area to face in a front right or front left direction, it is possible to detect that the occupant is seated by using the seat occupancy sensor.

According to the aspect in which the first switch module and the third switch module are electrically connected in parallel; the second switch module and the fourth switch module are electrically connected in parallel; and the first switch module and the third switch module that are connected in parallel are electrically connected in series with the second switch module and the fourth switch module that are connected in parallel, the seat occupancy sensor which is capable of detecting that the occupant is seated even when the occupant is seated on the seating area to face the front right or front left direction can be configured by electrical wiring. Therefore, the configuration of the seat occupancy sensor can be simplified.

According to the aspect in which the third pressure-sensitive switch of each of the first switch module and the second switch module is disposed below a hip point set in the vehicle seat in side view, even when the occupant takes a posture in which the positions of the thighs are laterally different, it is possible to detect that the occupant is seated by using the seat occupancy sensor.

According to the aspect in which the third pressure-sensitive switch of the first switch module and the third pressure-sensitive switch of the second switch module are spaced from each other so as to be symmetrically arranged with respect to the hip point in top view, the load from the buttocks of the occupant is easily applied to the respective third pressure-sensitive switches, whereby it is possible to detect that the occupant is seated more accurately by using the seat occupancy sensor.

According to the aspect in which the seat occupancy sensor further comprises additional switches respectively located laterally outside of the third switch module and the fourth switch module and the seat occupancy sensor is configured to be turned on regardless of a state of the third switch module and the fourth switch module, the additional switches can be arranged outside the buttocks of the occupant, and the additional switches may be configured to be turned on when the additional switches are pressed with a predetermined pressure or higher, whereby it is possible to cope with a case where a booster seat is placed on an upper surface of the seat cushion.

According to the aspect in which, in each of the switch modules, the third pressure-sensitive switch is disposed at a center between the corresponding first pressure-sensitive switch and second pressure-sensitive switch with respect to a lateral direction, the positions of the first pressure-sensitive switch and the second pressure-sensitive switch are arranged laterally side by side in front of the hip joint of the occupant, whereby, the first pressure-sensitive switch and the second pressure-sensitive switch are pressed by the thigh of the occupant, making it possible to detect that the occupant is seated more accurately.

According to the aspect in which the vehicle seat constitutes a rear seat of wheeled vehicle, it is possible, by using the seat occupancy sensor, to detect that the occupant is seated in the rear seat where the posture of the occupant can change significantly.

BRIEF DESCRIPTION OF THE DRAWING(S)

FIG. 12 is a top view of the rear seat with a seat occupancy sensor according to yet another embodiment; and FIG. 13 is a top view of the rear seat with a seat occupancy sensor according to yet another embodiment.

MODE(S) FOR CARRYING OUT THE INVENTION

Hereinafter, an embodiment in which a seat occupancy sensor according to the present invention is arranged on a seat of a vehicle such as an automobile will be described with reference to the drawings.

Figure 1:
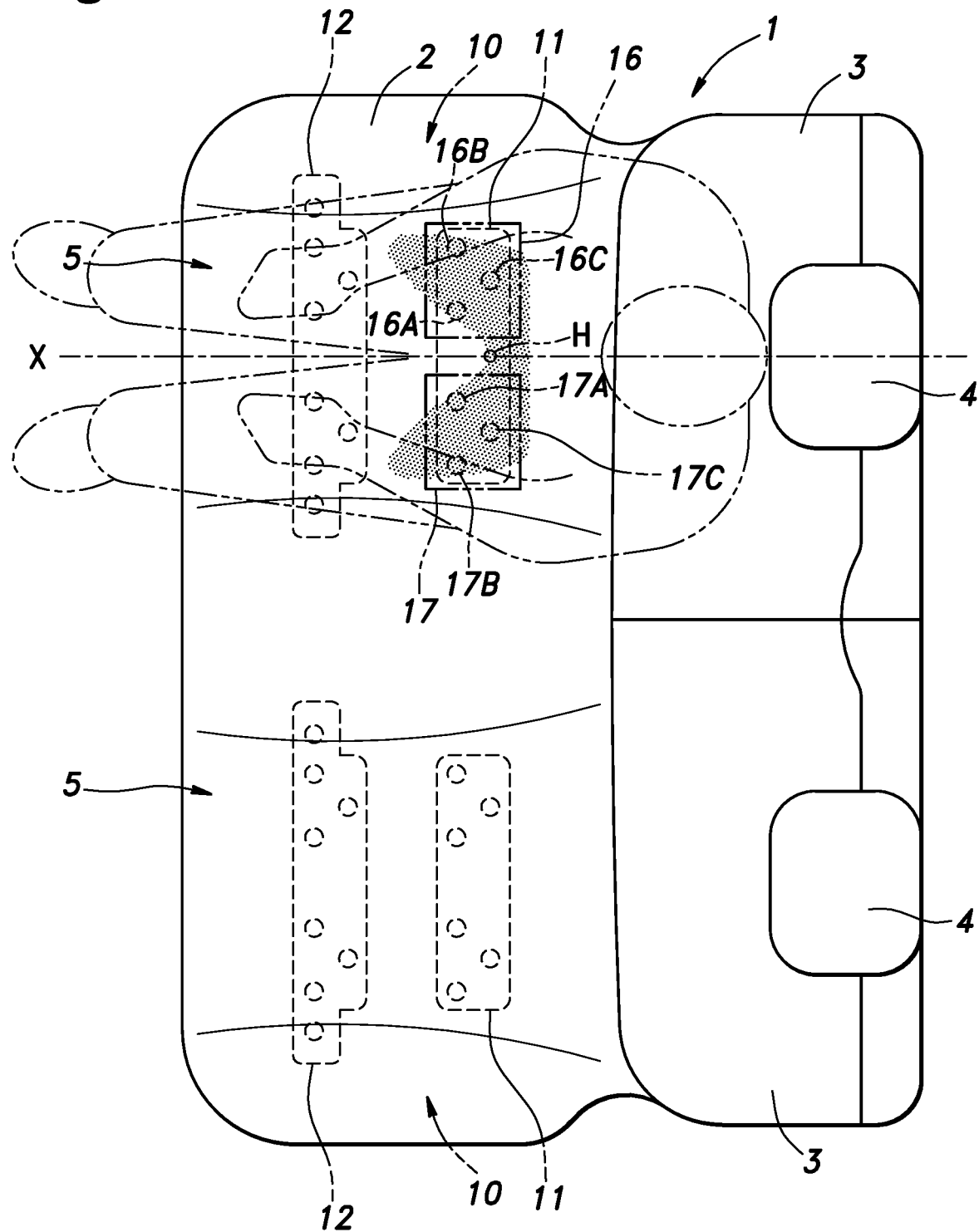
FIG. 1 is a top view of a rear seat provided with a seat occupancy sensor according to an embodiment.

As shown in FIG. 1, a seat 1 constitutes a rear seat in the second or third row of an automobile. The seat 1 includes a seat cushion 2 provided on the floor of the automobile, a pair of left and right seat backs 3 supported on a rear part of the seat cushion 2, and a pair of left and right headrests 4 provided on top of the respective seat backs 3. The seat cushion 2 extends laterally to form two seating areas 5 corresponding to two occupants. The seating areas 5 are provided laterally side by side on the seat cushion 2. The two seat backs 3 are arranged laterally side by side at positions corresponding to the respective seating areas 5, and are individually coupled to a rear end of the seat cushion 2. The left and right seat backs 3 and the left and right headrests 4 have a substantially left-right symmetric structure.

Figure 2:
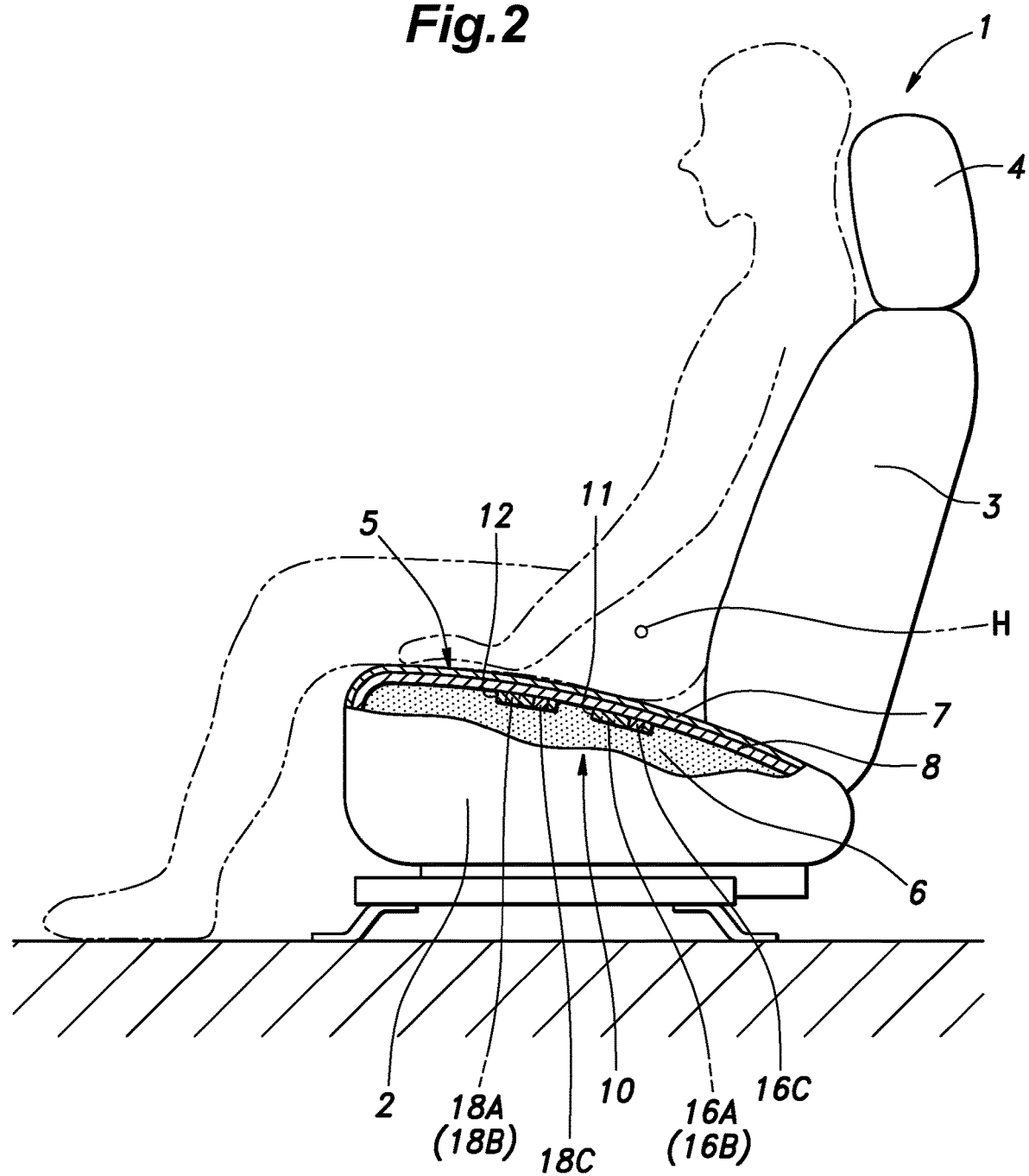
FIG. 2 is a side view of the rear seat provided with the seat occupancy sensor according to the embodiment.

As shown in FIG. 2, the seat cushion 2 includes a frame (not shown) having a rectangular frame shape, a pad member 6 supported by the frame, and a skin member 7 covering the surface of the pad member 6. In the present embodiment, a sheet-shaped wadding 8 is provided between the skin member 7 and the pad member 6.

As shown in FIG. 1, the upper surface of the seat cushion 2 is depressed in the lateral direction and inclined downward toward the rear in each seating area 5 to have a shape corresponding to the buttocks and the thighs of the occupant. When the occupant is seated, the buttocks and the thighs of the occupant are positioned on the seating area 5. Each seating area 5 is symmetric with respect to a symmetry plane extending substantially in the fore-and-aft direction and vertically. Hereinafter, description will be made of the seating area 5 on the right side, and the description of the seating area 5 on the right side will be applied to the seating area 5 on the left side by analogy. Further, a direction toward the symmetry plane X of the seating area 5 may be referred to as a laterally inward direction with respect to the seating area 5, and a direction away from the symmetry plane X may be referred to as a laterally outward direction with respect to the seating area 5, as necessary.

Figure 3:
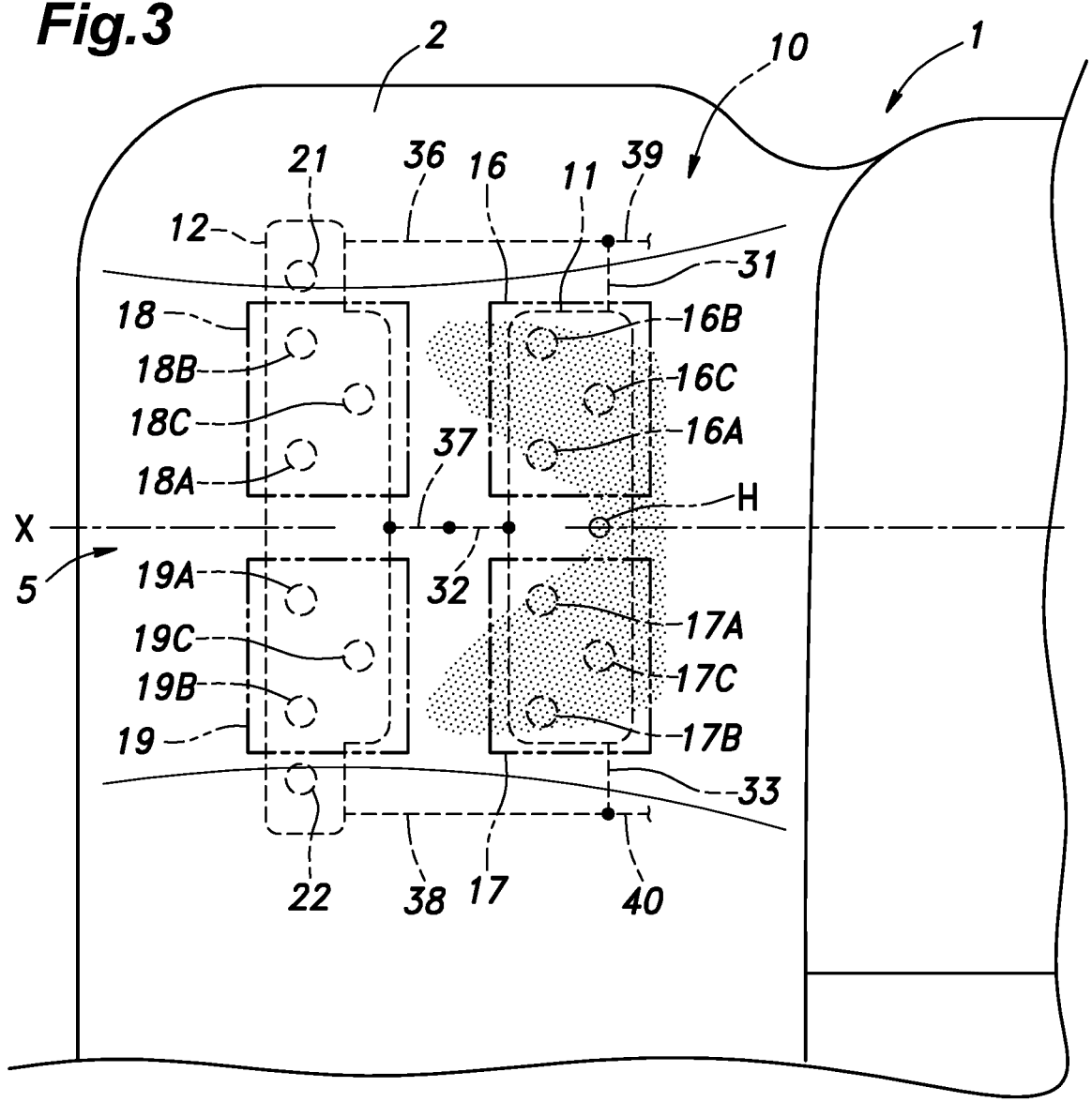
FIG. 3 is an enlarged view of a part containing the seat occupancy sensor in FIG. 1.

As shown in FIGS. 1 and 3, the seating area 5 is provided with a seat occupancy sensor 10 for detecting seating of the occupant. The seat occupancy sensor 10 corresponds to a switch that becomes conductive when the occupant is seated and becomes insulating when the occupant is not seated. The seat occupancy sensor 10 includes a first sensor sheet 11 and a second sensor sheet 12. The first sensor sheet 11 and the second sensor sheet 12 are each formed in a laterally extending sheet shape and are disposed between the skin member 7 and the pad member 6. The second sensor sheet 12 is arranged in front of the first sensor sheet 11. In the present embodiment, as shown in FIG. 2, the first sensor sheet 11 and the second sensor sheet 12 are both disposed between the wadding 8 and the pad member 6.

The first sensor sheet 11 and the second sensor sheet 12 are sheet-shaped members having flexibility. Each of the first sensor sheet 11 and the second sensor sheet 12 includes a pair of insulating resin sheets that vertically overlap each other and a resin spacer interposed therebetween. The first sensor sheet 11 is provided with a first switch module 16 and a second switch module 17. The first switch module 16 includes three pressure-sensitive switches; namely, a first pressure-sensitive switch 16A, a second pressure-sensitive switch 16B, and a third pressure-sensitive switch 16C. Similarly to the first switch module 16, the second switch module 17 includes three pressure-sensitive switches; namely, a first pressure-sensitive switch 17A, a second pressure-sensitive switch 17B, and a third pressure-sensitive switch 17C. The first switch module 16 and the second switch module 17 are arranged in the first sensor sheet 11 to be laterally spaced from each other. The second switch module 17 is located on the inboard side of the first switch module 16, and the first switch module 16 and the second switch module 17 are left-right symmetric with respect to the symmetry plane X. In the following, description will be made of the first switch module 16, and the description of the first switch module 16 will be applied to the second switch module 17 by analogy.

Each of the pressure-sensitive switches 16A to 16C is constituted by disk-shaped electrodes respectively provided on opposing surfaces of the insulating sheets and an opening formed in the spacer between the two electrodes. Each of the pressure-sensitive switches 16A to 16C functions as a membrane switch whose electrodes come into contact with each other such that the switch becomes conductive between the electrodes (turned on) when pressed by a pressure greater than or equal to a predetermined pressure. The pressure for making the electrodes conductive with each other is set in advance by adjusting the size of the electrodes, the shape of the opening, and the thickness of the spacer. In the present embodiment, the diameter of each electrode is set to about 1 cm, and the thickness of the spacer is set to about 100 μm. Note that each pressure-sensitive switch may have any configuration as long as it is a switch that becomes electrically conductive upon detection of a pressure.

As shown in FIG. 3, the first pressure-sensitive switch 16A and the second pressure-sensitive switch 16B are arranged laterally side by side in the seating area 5. The third pressure-sensitive switch 16C is arranged behind the first pressure-sensitive switch 16A and the second pressure-sensitive switch 16B. In front view, the third pressure-sensitive switch 16C is located substantially at the center between the first pressure-sensitive switch 16A and the second pressure-sensitive switch 16B with respect to the lateral direction. The second pressure-sensitive switch 16B is located laterally outward of the first pressure-sensitive switch 16A with respect to the seating area 5.

The third pressure-sensitive switch 16C of the first switch module 16 and the third pressure-sensitive switch 17C of the second switch module 17 are arranged to be spaced from a hip point H to the right and left, respectively, in top view (see FIG. 1) and are located below the hip point H in side view (see FIG. 2). The hip point H is a reference point defined for each seating area 5 with respect to the vehicle seat 1, and is determined in accordance with "Road Vehicles—Procedure for H-point Determination" (JIS D0024-1985) using a three-dimensional mannequin. The hip point H is a rotational center point between the trunk and the thigh of the three-dimensional mannequin seated in the seating position, and is located on the symmetry plane X. The distance between the third pressure-sensitive switches 16C and 17C may be preferably determined based on the distance between the ischial tuberosities of the smallest possible occupant who could be seated on the seating area 5; more specifically, based on an average distance between the ischial tuberosities of a six-year old child. The pressure thresholds at which the first to third pressure-sensitive switches 16A to 16C are respectively turned on may be preferably determined based on the pressures applied to the respective pressure-sensitive switches 16A to 16C when the smallest possible occupant who could be seated on the seating area 5 (more specifically, a six-year old child with standard weight and physique) is seated. The pressure thresholds at which the first pressure-sensitive switch 17A, the second pressure-sensitive switch 17B, and the third pressure-sensitive switch 17C of the second switch module 17 are turned on are set to be equal to the thresholds for the first pressure-sensitive switch 16A, the second pressure sensitive switch 16B, and the third pressure-sensitive switch 16C of the first switch module 16, respectively. In the present embodiment, the pressure thresholds for the first to third pressure-sensitive switches 16A to 16C are set to be equal.

The first pressure-sensitive switch 16A and the second pressure-sensitive switch 16B are arranged laterally side by side in front of the right hip joint of the occupant. Therefore, the first pressure-sensitive switch 16A and the second pressure-sensitive switch 16B are disposed at positions to be pressed by the right thigh of the occupant. The first pressure-sensitive switch 16A may be preferably provided at a position corresponding to the right thigh when the occupant is seated with the thighs closed.

The distance between the first pressure-sensitive switch 16A and the third pressure-sensitive switch 16C in the fore-and-aft direction is preferably greater than or equal to 2 cm and less than or equal to 5 cm, and is 3 cm in the present embodiment. The distance between the first pressure-sensitive switch 16A and the second pressure-sensitive switch 16B in the lateral direction is preferably greater than or equal to 2 cm and less than or equal to 5 cm, and is 3 cm in the present embodiment. The third pressure-sensitive switch 16C of the first switch module 16 and the third pressure-sensitive switch 17C of the second switch module 17 are preferably spaced laterally from each other by 8 cm or more and 20 cm or less, and by 10 cm in the present embodiment.

Figure 4:
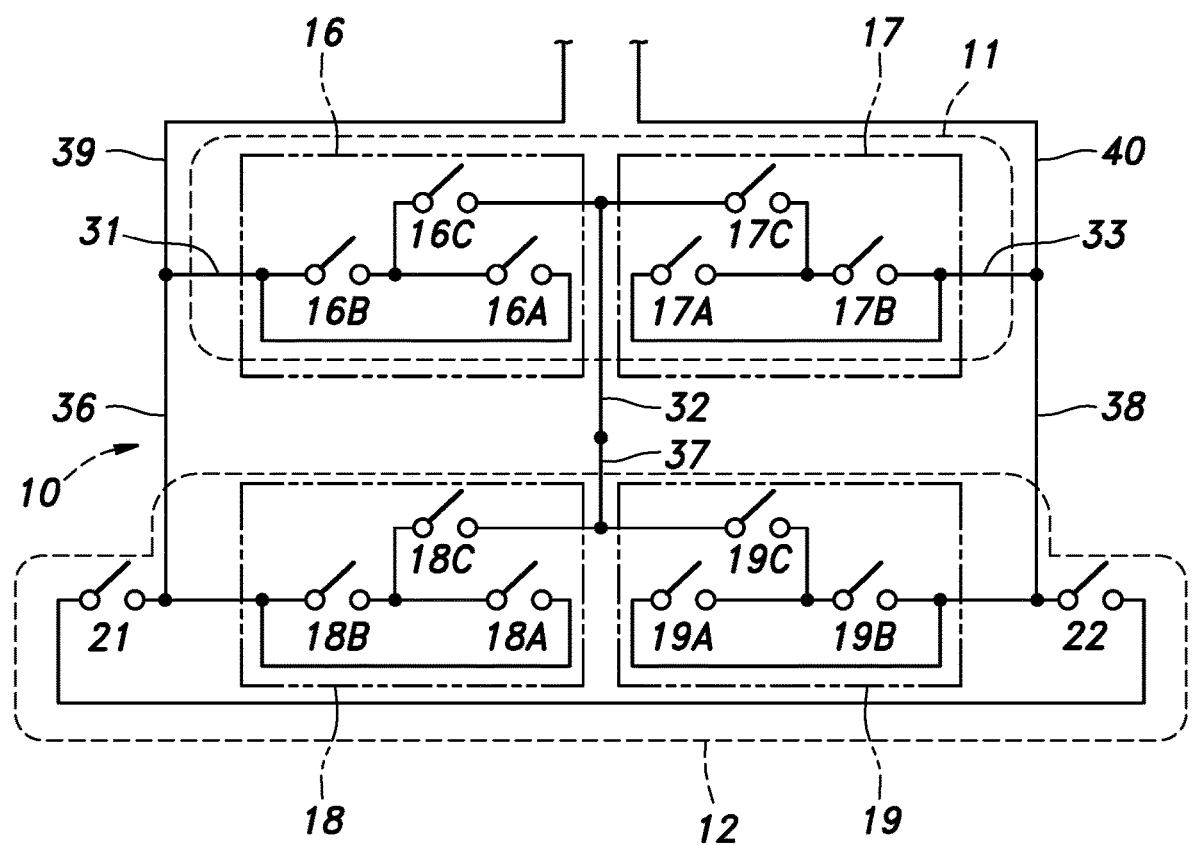
FIG. 4 is a circuit diagram of the seat occupancy sensor.

In the first sensor sheet 11, a circuit shown in FIG. 4 is formed by providing conductive strips on the upper and lower insulating sheets. In the first switch module 16, the first pressure-sensitive switch 16A and the second pressure-sensitive switch 16B are connected in parallel. Further, the third pressure-sensitive switch 16C is connected in series with the first pressure-sensitive switch 16A and the second pressure-sensitive switch 16B that are connected in parallel. When at least one of the first pressure-sensitive switch 16A and the second pressure-sensitive switch 16B is turned on and the third pressure-sensitive switch 16C is turned on, the first switch module 16 is turned on.

In the second switch module 17 also, similarly to the first switch module 16, the first pressure-sensitive switch 17A and the second pressure-sensitive switch 17B are connected in parallel, and further, the first pressure-sensitive switch 17A and the second pressure-sensitive switch 17B that are connected in parallel are connected in series with the third pressure-sensitive switch 17C. In the first sensor sheet 11, the first switch module 16 and the second switch module 17 are connected in series.

As shown in FIGS. 1 and 3, the second sensor sheet 12 is provided with a third switch module 18, a fourth switch module 19, a first additional switch 21, and a second additional switch 22. The fourth switch module 19 is located on the inboard side of the third switch module 18, and the third switch module 18 and the fourth switch module 19 are left-right symmetric with respect to the symmetry plane X. The third switch module 18 is located in front of the first switch module 16, and the fourth switch module 19 is located in front of the second switch module 17.

Similarly to the first switch module 16, the third switch module 18 includes a first pressure-sensitive switch 18A, a second pressure-sensitive switch 18B, and a third pressure-sensitive switch 18C. The first pressure-sensitive switch 18A of the third switch module 18 is located in front of the first pressure-sensitive switch 16A of the first switch module 16. In the third switch module 18, the relative position of the second pressure-sensitive switch 18B to the first pressure-sensitive switch 18A is the same as the relative position of the second pressure-sensitive switch 16B to the first pressure-sensitive switch 16A in the first switch module 16. In the third switch module 18, the relative position of the third pressure-sensitive switch 18C to the first pressure-sensitive switch 18A is the same as the relative position of the second pressure-sensitive switch 16B to the first pressure-sensitive switch 16A in the first switch module 16.

Similarly to the third switch module 18, the fourth switch module 19 includes a first pressure-sensitive switch 19A, a second pressure-sensitive switch 19B, and a third pressure-sensitive switch 19C. The first pressure-sensitive switch 19A, the second pressure-sensitive switch 19B, and the third pressure-sensitive switch 19C of the fourth switch module 19 are disposed at positions left-right symmetric to the positions of the first pressure-sensitive switch 18A, the second pressure-sensitive switch 18B, and the third pressure-sensitive switch 18C of the third switch module 18 with respect to the symmetry plane X.

Similarly to the first switch module 16, in the third switch module 18 also, the first pressure-sensitive switch 18A and the second pressure-sensitive switch 18B are connected in parallel, and the first pressure-sensitive switch 18A and the second pressure-sensitive switch 18B that are connected in parallel are connected in series with the third pressure-sensitive switch 18C. Similarly, in the fourth switch module 19, the first pressure-sensitive switch 19A and the second pressure-sensitive switch 19B are connected in parallel, and the first pressure-sensitive switch 19A and the second pressure-sensitive switch 19B that are connected in parallel are connected in series with the third pressure-sensitive switch 19C.

The distance between the first pressure-sensitive switch 18A of the third switch module 18 and the first pressure-sensitive switch 16A of the first switch module 16 is preferably set to be greater than or equal to 10 cm and less then or equal to 15 cm, and is set to 13 cm in the present embodiment. The pressure thresholds at which the first pressure-sensitive switches 18A, 19A, the second pressure-sensitive switches 18B, 19B, and the third pressure-sensitive switches 18C, 19C of the third switch module 18 and the fourth switch module 19 are turned on are set to be equal to the thresholds for the first pressure-sensitive switch 16A, the second pressure-sensitive switch 16B, and the third pressure-sensitive switch 16C of the first switch module 16, respectively.

The first additional switch 21 and the second additional switch 22 are pressure-sensitive switches similar to the first pressure-sensitive switch 16A of the first switch module 16. The first additional switch 21 and the second additional switch 22 are located laterally outward of the third switch module 18 and the fourth switch module 19, respectively, with respect to the seating area 5. The first additional switch 21 and the second additional switch 22 are left-right symmetric with respect to the symmetry plane X. The first additional switch 21 and the second additional switch 22 are arranged along the first pressure-sensitive switch 18A and the second pressure-sensitive switch 18B of the third switch module 18 and the first pressure-sensitive switch 19A and the second pressure-sensitive switch 19B of the fourth switch module 19 such that they are laterally in line. The first additional switch 21 is located outboard (rightward) of the third switch module 18, and the second additional switch 22 is located inboard (leftward) of the fourth switch module 19.

The first additional switch 21 and the second additional switch 22 are both provided at positions where pressure is applied when a booster seat 25 is placed on the seating area 5 and the occupant is seated on the booster seat 25. The booster seat 25 is an auxiliary seat to be installed on the seat cushion 2 to increase the seat height so that a small occupant (for example, a child aged 6 years or younger) can wear a three-point seat belt.

The first additional switch 21 and the second additional switch 22 are preferably spaced laterally from each other by 20 cm or more and 40 cm or less, and by 23 cm in the present embodiment. The pressure thresholds at which the first additional switch 21 and the second additional switch 22 are turned on may be respectively set based on the pressures applied to the first additional switch 21 and the second additional switch 22 when the smallest possible occupant who may use the booster seat 25 (for example, a six-year old child with standard weight and physique) is seated.

As shown in FIG. 4, in the second sensor sheet 12, the third switch module 18 and the fourth switch module 19 are connected in series. The first additional switch 21 and the second additional switch 22 are connected in series. The third switch module 18 and the fourth switch module 19 that are connected in series and the first additional switch 21 and the second additional switch 22 that are connected in series are connected in parallel.

As shown in FIGS. 3 and 4, the first sensor sheet 11 is provided with three electrodes for external connection, and three cables 31, 32, and 33 are respectively connected to the electrodes. The three cables 31, 32, 33 are electrically connected to one end of the first switch module 16, to the other end of the first switch module 16 and one end of the second switch module 17, and to the other end of the second switch module 17, respectively, via the conductive strips provided on the insulating sheets.

As shown in FIGS. 3 and 4, the second sensor sheet 12 is provided with three electrodes for external connection, and three cables 36, 37, and 38 are connected thereto. The three cables 36, 37, 38 are electrically connected to the third switch module 18 and the first additional switch 21, to the other end of the third switch module 18 and one end of the fourth switch module 19, and to the other end of the fourth switch module 19 and the second additional switch 22, respectively, via the conductive strips provided on the insulating seats.

The cable 31 of the first sensor sheet 11 is connected to the cable 36 of the second sensor sheet 12. The cable 32 of the first sensor sheet 11 is connected to the cable 37 of the second sensor sheet 12. The cable 33 of the first sensor sheet 11 is connected to the cable 38 of the second sensor sheet 12.

By the connection of these cables, the first switch module 16 and the third switch module 18 are electrically connected in parallel, and the second switch module 17 and the fourth switch module 19 are electrically connected in parallel. The first switch module 16 and the third switch module 18 that are connected in parallel and the second switch module 17 and the fourth switch module 19 that are connected in parallel are electrically connected in series, and this series connection is connected in parallel to the first additional switch 21 and the second additional switch 22 that are connected in series. The seat occupancy sensor 10 becomes conductive or is turned on when at least one of the following conditions is met: the first switch module 16 and the second switch module 17 are both on; the third switch module 18 and the fourth switch module 19 are both on; the first switch module 16 and the fourth switch module 19 are both on; the second switch module 17 and the third switch module 18 are both on, and the first additional switch 21 and the second additional switch 22 are both on.

The seat occupancy sensor 10 includes a cable 39 having one end connected to the cables 31 and 36 and a cable 40 having one end connected to the cables 33 and 38. The other ends of the cables 39 and 40 are connected to an ECU (not shown in the drawings) mounted on the vehicle body. The ECU controls the vehicle body and determines whether or not the occupant is seated based on the conduction between the cable 39 and the cable 40, that is, on/off of the seat occupancy sensor. Further, the ECU determines whether the seat belt is worn in each of the seating areas 5. When it is determined that the occupant is seated on the seating area 5 and the seat belt is not worn, the ECU provides a warning to the occupant by sound or by turning on an alarm light (not shown in the drawings).

Next, effects of the seat occupancy sensor 10 in the present embodiment will be described. In FIGS. 1 and 3, a region where the pressure applied to the surface of the pad member 6 when the occupant is seated is greater than or equal to the pressure threshold at which the first pressure-sensitive switch 16A of the first switch module 16 is turned on is shown by shading. As shown in FIG. 3, at this time, the first pressure-sensitive switch 16A, the second pressure-sensitive switch 16B, and the third pressure-sensitive switch 16C of the first switch module 16 are all turned on, and the first switch module 16 is turned on. In the second switch module 17, the three pressure-sensitive switches 17A, 17B, and 17C are all turned on, and the second switch module 17 is turned on. Therefore, the seat occupancy sensor 10 is turned on, and it can be detected that the occupant is seated.

Figure 5:
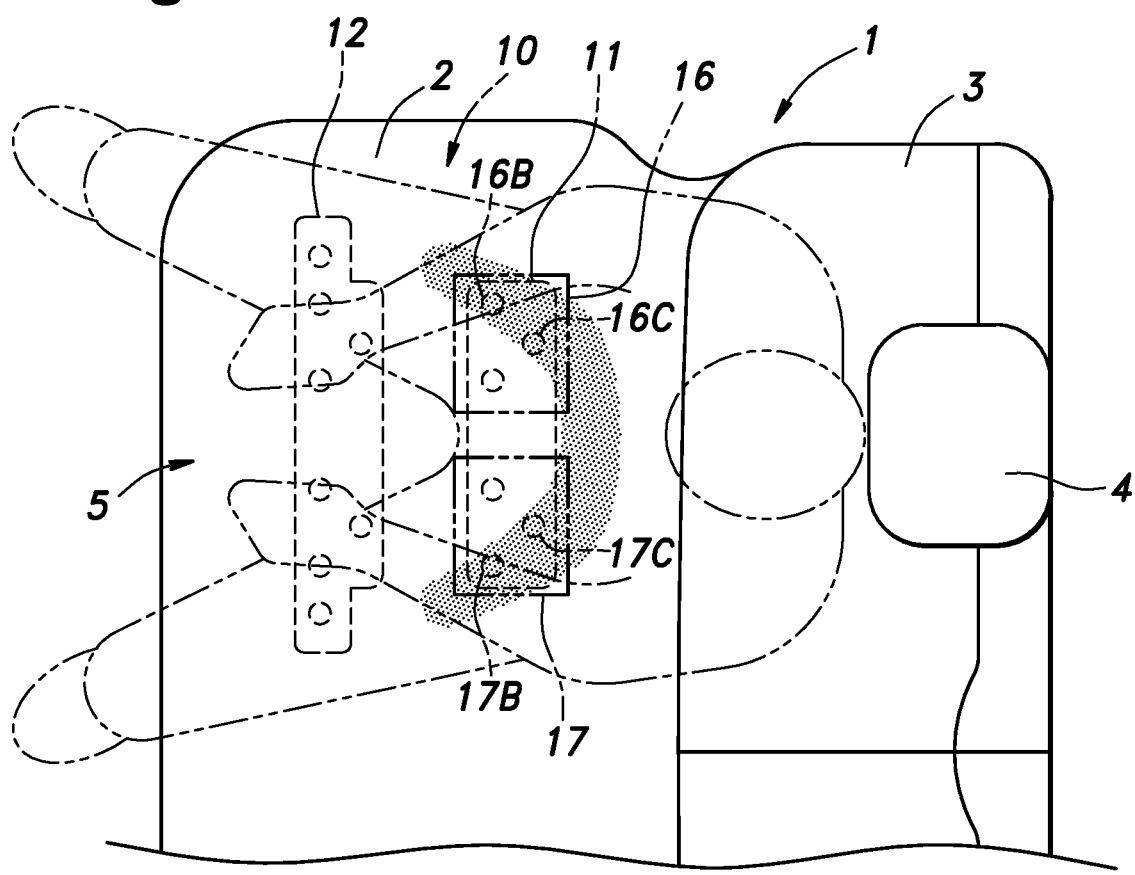
FIG. 5 is a top view of the rear seat when an occupant is seated thereon with the thighs open.

Since the seat occupancy sensor 10 is provided in the rear seat, the pressure distribution can vary greatly depending on the posture of the occupant. As an example of this, FIG. 5 shows a case where the occupant is seated with the thighs open. As in FIG. 1, in FIG. 5 the region where the pressure applied to the surface of the pad member 6 is greater than or equal to the threshold is shown by shading. The third pressure-sensitive switch 16C of the first switch module 16 and the third pressure-sensitive switch 17C of the second switch module 17 are both turned on because they are arranged at positions corresponding to the ischial tuberosities of the occupant. The second pressure-sensitive switch 16B of the first switch module 16 and the second pressure-sensitive switch 17B of the second switch module 17 are located at positions corresponding to the thighs of the occupant and thus are both turned on.

Since both the second pressure-sensitive switch 16B and the third pressure-sensitive switch 16C are on, the first switch module 16 is turned on. Thus, even when the position of the thigh is shifted laterally so that one of the first pressure-sensitive switch 16A and the second pressure-sensitive switch 16B is off, the first switch module 16 is turned on because the first pressure-sensitive switch 16A and the second pressure-sensitive switch 16B are connected in parallel. Therefore, it is possible to detect that the occupant is seated regardless of the position of the thigh of the occupant. In the second switch module 17 also, similarly to the first switch module 16, the second pressure-sensitive switch 17B is turned on and the third pressure-sensitive switch 17C is turned on, so that the second switch module 17 is turned on. Therefore, the seat occupancy sensor 10 is turned on, and it can be detected that the occupant is seated in the rear seat where the posture of the occupant can change significantly.

Figure 6:
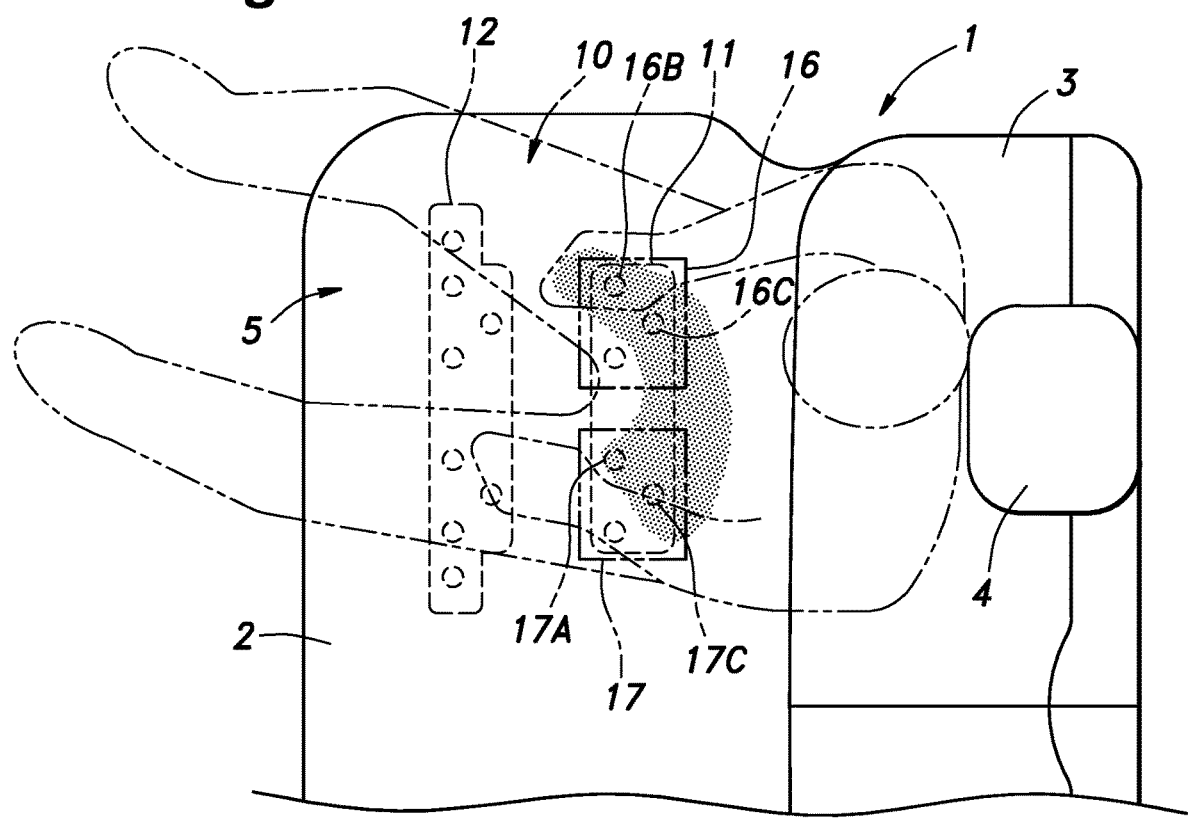
FIG. 6 is a top view of the rear seat when an occupant is seated thereon with a posture tilted to the right.

FIG. 6 shows a case where the occupant is seated with a posture tilted to the right. As in FIG. 1, in FIG. 6 the region where the pressure applied to the surface of the pad member 6 is greater than or equal to the threshold is shown by shading. In the first switch module 16, the second pressure-sensitive switch 16B and the third pressure-sensitive switch 16C are both on, while the first pressure-sensitive switch 16A is off. At this time, the first switch module 16 is turned on. Thus, even when only one of the first pressure-sensitive switch 16A and the second pressure-sensitive switch 16B is turned on depending on the position of the thigh, the first switch module 16 is turned on because the first pressure-sensitive switch 16A and the second pressure-sensitive switch 16B are connected in parallel. In the second switch module 17 also, since the first pressure-sensitive switch 17A and the third pressure-sensitive switch 17C are turned on, the second switch module 17 is turned on. Therefore, the seat occupancy sensor 10 is turned on, and it can be detected that the occupant is seated.

Figure 7:
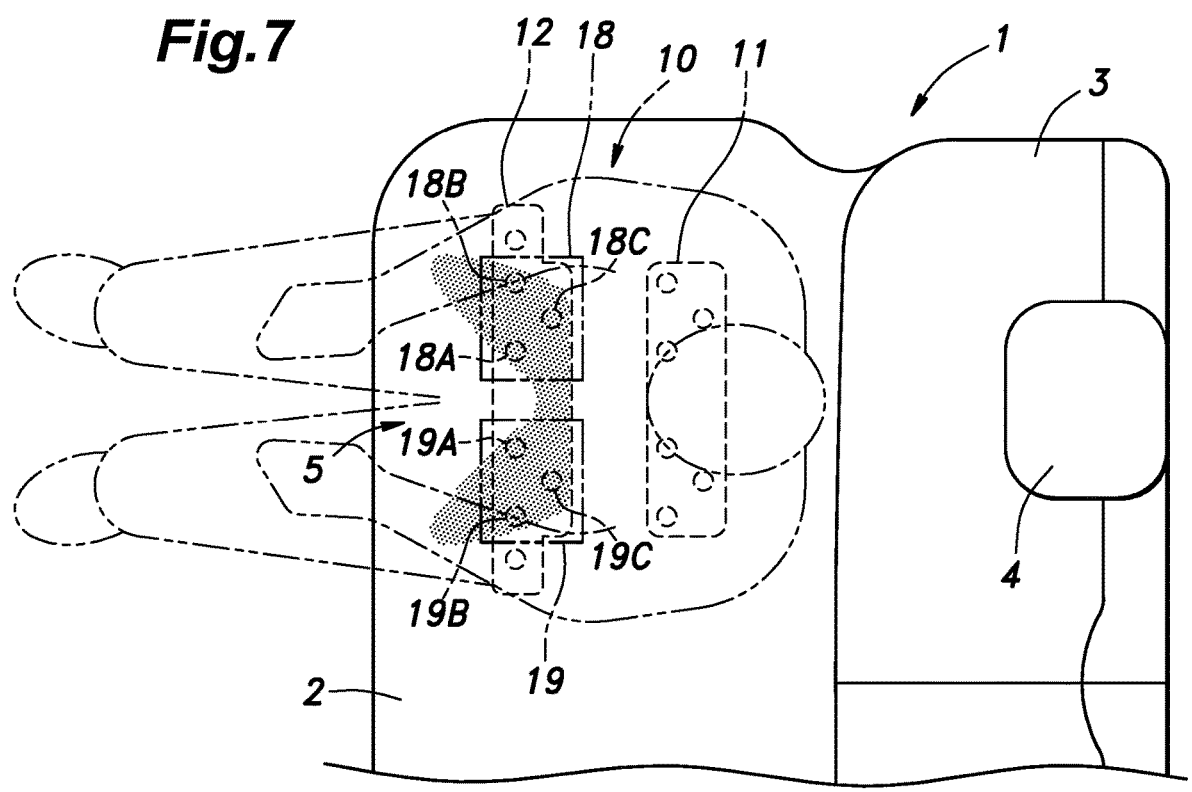
FIG. 7 is a top view of the rear seat when an occupant is seated on a front part of a seating area.

FIG. 7 shows a case where the occupant is seated on a front part of the seating area 5. As in FIG. 1, in FIG. 7 the region where the pressure applied to the surface of the pad member 6 is greater than or equal to the threshold is shown by shading. In this case, the third switch module 18 and the fourth switch module 19 are both turned on, so that the seat occupancy sensor 10 is turned on. Therefore, it can be detected that the occupant is seated.

Figure 8:
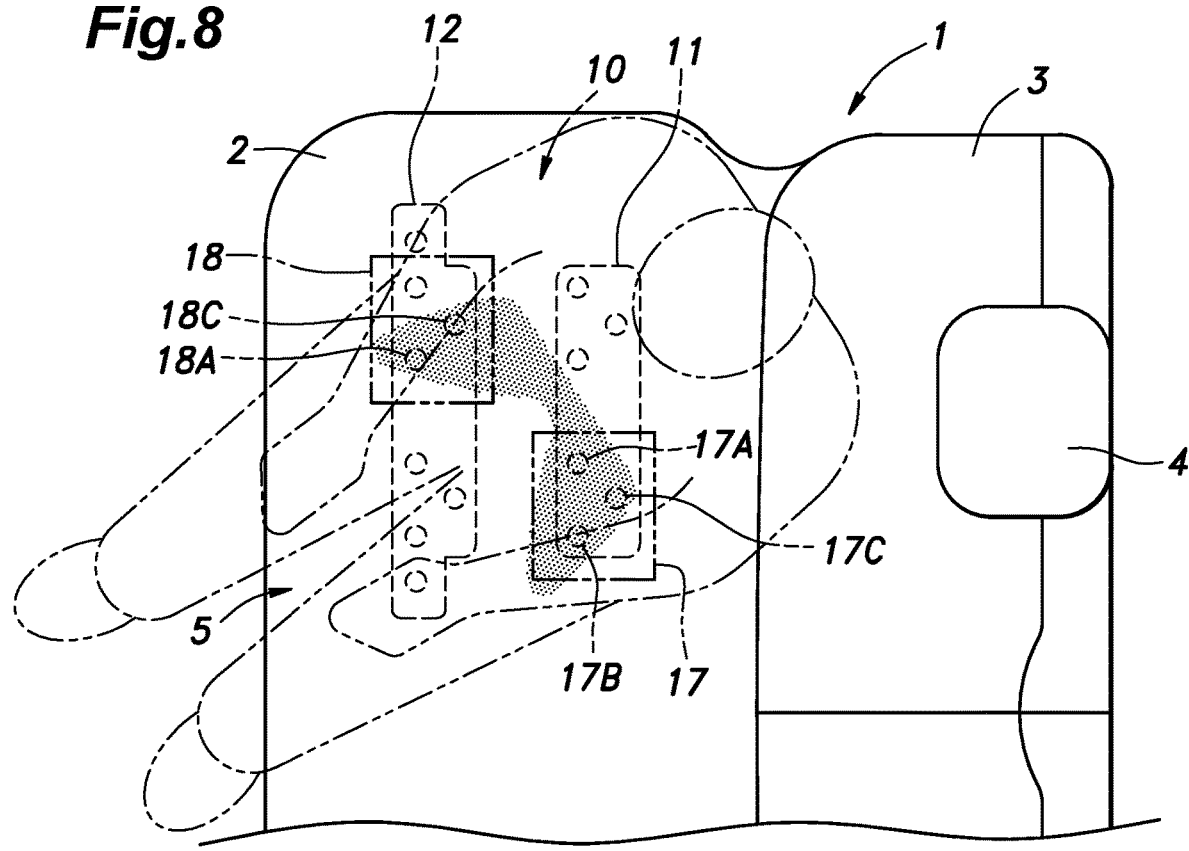
FIG. 8 is a top view of the rear seat when an occupant is seated on the seating area to face in a front left direction.

FIG. 8 shows a case where the occupant is seated on the seating area 5 to face in a left inward direction. As in FIG. 1, in FIG. 8 the region where the pressure applied to the surface of the pad member 6 is greater than or equal to the threshold is shown by shading. In this case, both the second switch module 17 and the third switch module 18 are turned on, and the seat occupancy sensor 10 is turned on. Therefore, it can be detected that the occupant is seated.

Figure 9:
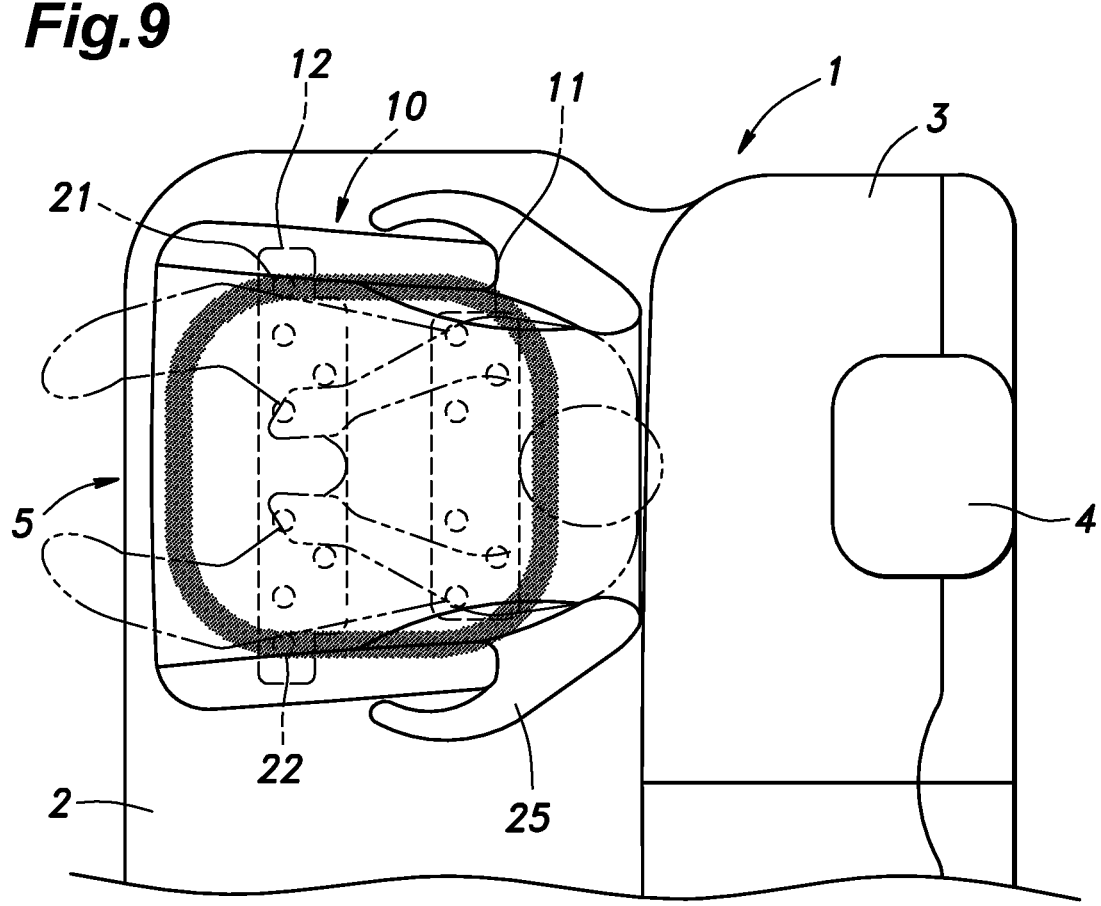
FIG. 9 is a top view of the rear seat when an occupant is seated thereon using a booster seat.

FIG. 9 is a top view showing a state where a six-year old child having an average physique is seated on a booster seat 25 placed on the seating area 5. In FIG. 9, a region where the pressure applied to the surface of the pad member 6 is greater than or equal to the pressure threshold at which both the first additional switch 21 and the second additional switch 22 are turned on is shown by shading. At this time, as shown in FIG. 9, the first additional switch 21 and the second additional switch 22 are turned on. Accordingly, the seat occupancy sensor 10 is turned on, and it can be detected that the occupant is seated. Therefore, a warning can be provided when the occupant seated on the booster seat 25 does not wear the seat belt.

Figure 10:
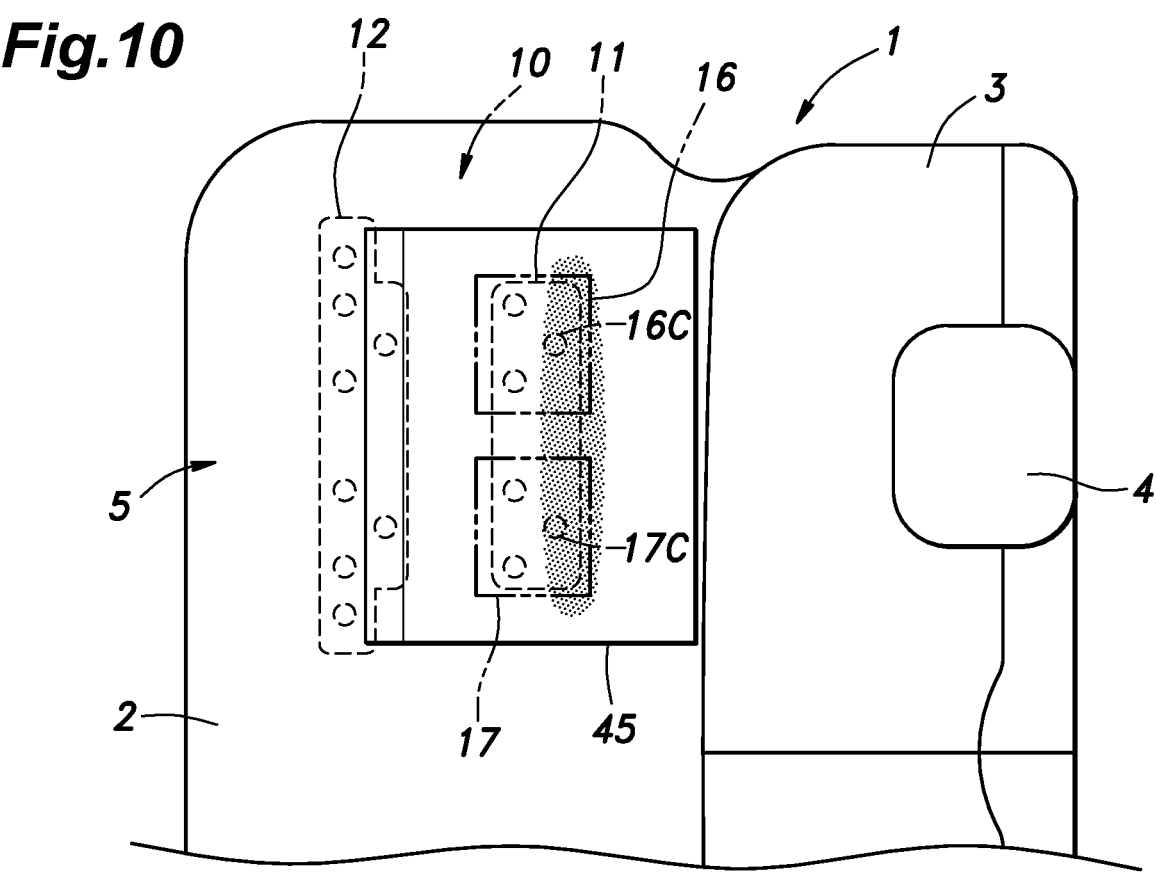
FIG. 10 is a top view of the rear seat when a box-shaped object containing luggage is placed on the seating area.

The distribution of pressure applied to the surface of the pad member 6 when the occupant is seated tends to spread laterally and in the fore-and-aft direction according to the shape of the buttocks of the occupant. On the other hand, when a box-shaped object 45 such as a cardboard box in which articles are contained is placed on the seating area 5, the box-shaped object 45 is inclined backward due to a slope formed in the upper surface of the seat cushion 2. In FIG. 10, a region where the pressure applied to the surface of the pad member 6 when the box-shaped object 45 is placed on the seating area 5 is greater than or equal to the pressure threshold at which the first pressure-sensitive switch 16A of the first switch module 16 is turned on is shown by shading. As shown in FIG. 10, the region where the pressure applied to the surface of the pad member 6 is greater than or equal to the threshold does not spread in the fore-and-aft direction, and is formed in a straight line extending laterally in a rear part of the seating area 5. As a result, in the first switch module 16 and the second switch module 17, only the third pressure-sensitive switches 16C and 17C located on the rear side are turned on, and the seat occupancy sensor 10 is off. Therefore, the seat occupancy sensor 10 can distinguish the box-shaped object 45 containing articles from the occupant. Further, since the first additional switch 21 and the second additional switch 22 are provided on the front part in the seating area 5, the pressure applied from the box-shaped object 45 to the first additional switch 21 and the second additional switch 22 is reduced. Therefore, the box-shaped object 45 and the occupant can be distinguished more reliably.

Since the seat occupancy sensor 10 is configured by electrically connecting multiple pressure-sensitive switches, there is no need to use a logic IC or the like, and the configuration is simple and can be configured easily.

Figure 11:
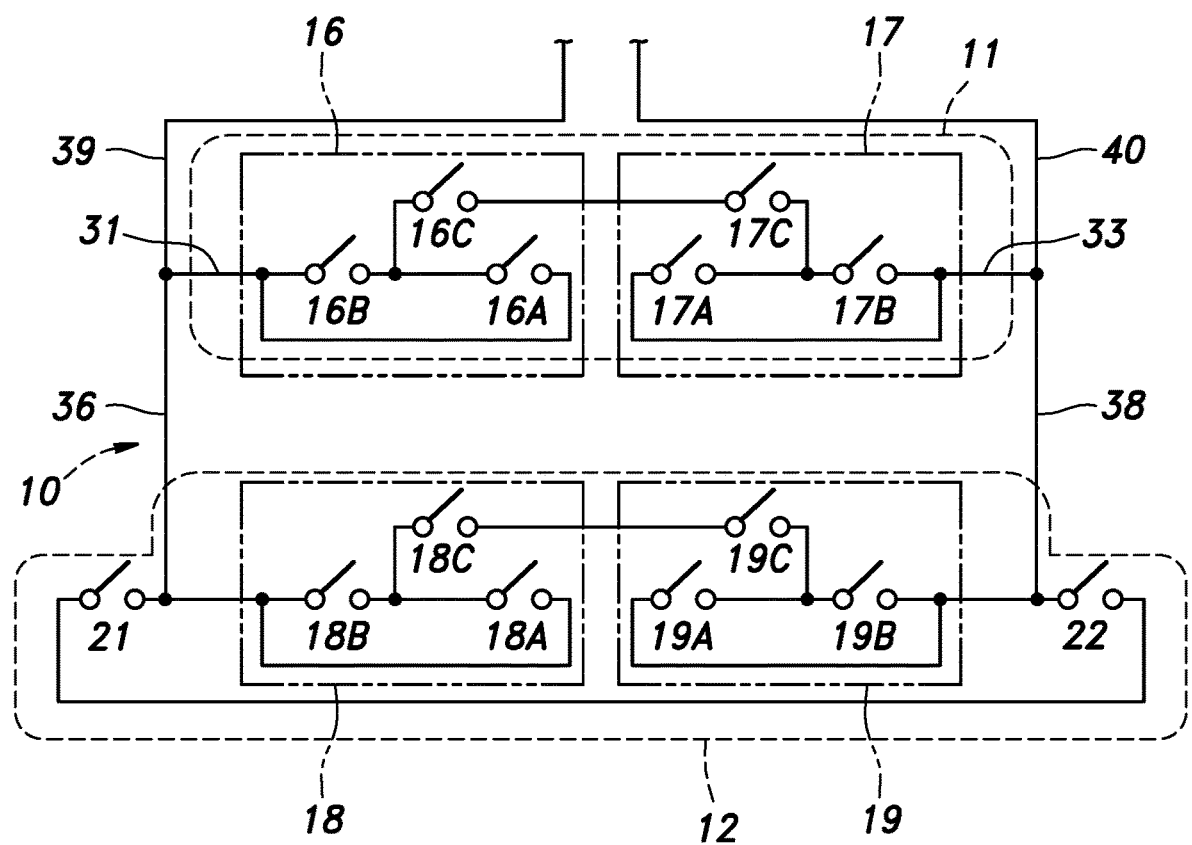
FIG. 11 is a circuit diagram of a seat occupancy sensor according to another embodiment.

The specific embodiment has been described above, but the seat occupancy sensor 10 according to the present invention is not limited to the above embodiment. As shown in FIG. 11, the seat occupancy sensor 10 may be a modified so as not to include the cable 32 and the cable 37. In this case, the first switch module 16 and the second switch module 17 are electrically connected in series, the third switch module 18 and the fourth switch module 19 are electrically connected in series, and the first switch module 16 and the second switch module 17 that are connected in series and the third switch module 18 and the fourth switch module 19 that are connected in series are electrically connected in parallel to each other and in parallel to the first additional switch 21 and the second additional switch 22 that are connected in series. The seat occupancy sensor 10 is turned on when any of the following conditions is met: the first switch module 16 and the second switch module 17 are both on; the third switch module 18 and the fourth switch module 19 are both on; and the first additional switch 21 and the second additional switch 22 are both on. By using the seat occupancy sensor 10 configured as above, it is possible to detect that the occupant is seated when the occupant is seated with the thighs open (FIG. 5), when the occupant is seated with a tilted posture (FIG. 6), when the occupant is seated on a front part of the seating area 5 (FIG. 8), and when the occupant is seated using a booster seat (FIG. 9).

As shown in FIG. 12, it is only required that one of the third pressure-sensitive switches 16C, 17C, 18C, and 19C be located at a position corresponding to the buttocks of the occupant and the first pressure-sensitive switches 16A, 17A, 18A, 19A and the second pressure-sensitive switches 16B, 17B, 18B, and 19B be provided at positions corresponding to the thighs of the occupant, and it is not necessarily required that each of the third pressure-sensitive switches 16C, 17C, 18C, and 19C is disposed at the center between the corresponding ones of the first pressure-sensitive switches 16A, 17A, 18A, and 19A and the second pressure-sensitive switches 16B, 17B, 18B, and 19B in front view.

As shown in FIG. 13, the first pressure-sensitive switches 16A and 17A of the first switch module 16 and the second switch module 17 may be replaced with one pressure-sensitive switch 51. The first switch module 16 includes the pressure-sensitive switch 51, the second pressure-sensitive switch 16B, and the third pressure-sensitive switch 16C, and the second switch module 17 includes the pressure-sensitive switch 51, the second pressure-sensitive switch 17B, and the third pressure-sensitive. switch 17C. The first switch module 16 is preferably turned on when the pressure-sensitive switch 51 is on or the second pressure-sensitive switch 16B is on, and the third pressure-sensitive switch 16C is on. Also, the second switch module 17 is preferably turned on when the pressure-sensitive switch 51 is on or the second pressure-sensitive switch 17B is on, and the third pressure-sensitive switch 17C is on. Similarly, the first pressure-sensitive switches 18A and 19A of the third switch module 18 and the fourth switch module 19 may be replaced with one pressure-sensitive switch 52. As described above, by sharing the pressure-sensitive switches 51 and 52, the number of pressure-sensitive switches can be reduced and the configuration can be further simplified.

In the above embodiment, the seat occupancy sensor 10 includes the first sensor sheet 11 and the second sensor sheet 12. However, it is possible to connect the first sensor sheet 11 and the second sensor sheet 12 to form a single sheet.

GLOSSARY 1 seat
2 seat cushion 5 seating area
10 seat occupancy sensor
16 first switch module
17 second switch module
18 third switch module
19 fourth switch module
16A, 17A, 18A, 19A first pressure-sensitive switch
16B, 17B, 18B, 19B second pressure-sensitive switch
16C, 17C, 18C, 19C third pressure-sensitive switch
16D, 17D, 18D, 19D fourth pressure-sensitive switch
21 first additional switch (the first additional pressure-sensitive switch)
22 second additional switch (the second additional pressure-sensitive switch)
H hip point

The invention claimed is:

1. A seat occupancy sensor provided in a vehicle seat, comprising a pair of switch modules disposed in an occupant seating area of a seat cushion so as to be laterally spaced from each other, wherein:
 each of the switch modules includes a first pressure-sensitive switch and a second pressure-sensitive switch that are disposed on a front part so as to be laterally spaced from each other and a third pressure-sensitive switch disposed on a rear part;
 each of the switch modules is configured to be turned on when at least one of the first pressure-sensitive switch and the second pressure-sensitive switch is on and the third pressure-sensitive switch is on; and
 the seat occupancy sensor is configured to be turned on when the switch modules are both on.

2. The seat occupancy sensor according to claim 1, wherein:
 each of the first pressure-sensitive switch, the second pressure-sensitive switch, and the third pressure-sensitive switch is a switch configured to be conductive and turned on when a predetermined pressure is applied;
 in each of the switch modules, the first pressure-sensitive switch and the second pressure-sensitive switch are electrically connected in parallel and the third pressure-sensitive switch is connected in series with the first pressure-sensitive switch and the second pressure that are connected in parallel; and
 the switch modules are electrically connected in series with each other.

3. The seat occupancy sensor according to claim 1, wherein:
 the switch modules include two pairs of left and right switch modules arranged such that one pair is located behind the other;
 the rear pair of switch modules includes a first switch module disposed on a right side and a second switch module disposed on a left side;
 the front pair of switch modules includes a third switch module disposed on a right side and a fourth switch module disposed on a left side;
 the third switch module is located in front of the first switch module;
 the fourth switch module is located in front of the second switch module; and
 the seat occupancy sensor is configured to be turned on when both the first switch module and the second switch module are on or when both the third switch module and the fourth switch module are on.

4. The seat occupancy sensor according to claim 3, wherein:
 the first switch module and the second switch module are electrically connected in series;
 the third switch module and the fourth switch module are electrically connected in series; and
 the first switch module and the second switch module that are connected in series are electrically connected in parallel to the third switch module and the fourth switch module that are connected in series.

5. The seat occupancy sensor according to claim 3, wherein the seat occupancy sensor is configured to be also turned on when the first switch module and the fourth switch module are on or when the second switch module and the third switch module are on.

6. The seat occupancy sensor according to claim 5, wherein:
 the first switch module and the third switch module are electrically connected in parallel;
 the second switch module and the fourth switch module are electrically connected in parallel; and
 the first switch module and the third switch module that are connected in parallel are electrically connected in series the second switch module and the fourth switch module that are connected in parallel.

7. The seat occupancy sensor according to claim 3, wherein the third pressure-sensitive switch of each of the first switch module and the second switch module is disposed below a hip point set in the vehicle seat in side view.

8. The seat occupancy sensor according to claim 7, wherein the third pressure-sensitive switch of the first switch module and the third pressure-sensitive switch of the second switch module are spaced from each other so as to be symmetrically arranged with respect to the hip point in top view.

9. The seat occupancy sensor according to claim 8, further comprising a first additional pressure-sensitive switch provided to the right of the third switch module and a second additional pressure-sensitive switch provided to the left of the fourth switch module,
 wherein the seat occupancy sensor is configured to be turned on regardless of a state of the third switch module and the fourth switch module.

10. The seat occupancy sensor according to claim 1, wherein in each of the switch modules, the third pressure-sensitive switch is disposed at a center between the corresponding first pressure-sensitive switch and second pressure-sensitive switch with respect to a lateral direction.

11. The seat occupancy sensor according to claim 1, wherein the vehicle seat constitutes a rear seat of a wheeled vehicle.

* * * * *